United States Patent
Nachbauer et al.

(10) Patent No.: US 8,754,637 B2
(45) Date of Patent: Jun. 17, 2014

(54) ARRANGEMENT FOR CONNECTING AN ELECTRICAL COMPONENT TO AN ELECTRICAL UNIT

(75) Inventors: Otto Nachbauer, Floss (DE); Dietmar Voelkl, Plossberg (DE)

(73) Assignee: Nexans, Paris (FR)

( * ) Notice: Subject to any disclaimer, the term of this patent is extended or adjusted under 35 U.S.C. 154(b) by 512 days.

(21) Appl. No.: 13/186,638

(22) Filed: Jul. 20, 2011

(65) Prior Publication Data

US 2012/0077362 A1    Mar. 29, 2012

(30) Foreign Application Priority Data

Sep. 24, 2010  (EP) .................................... 10306027

(51) Int. Cl.
*G01R 1/04*    (2006.01)
(52) U.S. Cl.
USPC ........................................................ 324/156
(58) Field of Classification Search
CPC ........ B06R 16/0222; F42B 3/195; H02G 3/22
USPC ........................................................ 324/156
See application file for complete search history.

(56) References Cited

U.S. PATENT DOCUMENTS

2006/0083288 A1*  4/2006  Riedel et al. .................. 374/141
2007/0163457 A1*  7/2007  Matsumura et al. ....... 102/202.7

* cited by examiner

*Primary Examiner* — Tung X Nguyen
(74) *Attorney, Agent, or Firm* — Sofer & Haroun, LLP

(57) ABSTRACT

An arrangement is proposed for electrically conductively connecting an electrical component which is mounted in a housing containing oil, to an electrical unit, and mounted in which between the component and the unit at least two cores are arranged which consist of an electrical conductor and an insulation surrounding the conductor. The housing includes an opening which in the position of use is closed in an oil-tight moisture-tight manner which has at least one passage hole (9) for passing the cores (4,5) therethrough. For the cores (4,5) is provided a core for each in which material impermeable to oil is mounted between the conductor and its insulation, in such a way that all hollow spaces existing within the space surrounded by the insulation. The cores (4,5) are guided through at least one sealing plug which tightly surrounds the cores, and the sealing plug is in the position of use mounted in a passage hole (9) of the passage (7) in an oil-tight and moisture-tight manner.

4 Claims, 1 Drawing Sheet

ARRANGEMENT FOR CONNECTING AN ELECTRICAL COMPONENT TO AN ELECTRICAL UNIT

RELATED APPLICATION

This application claims the benefit of priority from European Patent Application No. 10 306 027.3 filed on Sep. 24, 2010, the entirety of which is incorporated by reference,

BACKGROUND

1. Field of the Invention

The invention relates to an arrangement for electrically connecting an electrical component which is mounted in a housing containing oil, to an electrical unit in which are arranged between the component and the unit at least two cores composed of an electrical conductor and of an insulation surrounding the conductor.

Such an arrangement is used, for example, in transmissions of motor vehicles which are accommodated in housings containing oil. "Electrical components" in the sense of the invention may be, for example, sensors which monitor the rate of rotation of the individual wheels of the transmission, or valves or actors through which the positions of the wheels can be adjusted. In the following, representing all possible components to be arranged in the housing, the sensors are taken into consideration.

2. Description of Related Art

As already mentioned, the rate of rotation of the individual wheels of a transmission can be monitored by means of the sensors using known technology. The sensors are connected through electrical cores to an electrical or electronic unit. Such sensors are known and available on the market. They operate, for example, inductively or utilize the Hall effect. Errors occurring in a transmission are indicated in the respective motor vehicle, for example, in a display field, so that they can be eliminated. The sensors are in the housing continuously surrounded by oil or wetted by oil. This is also true for the areas of the cores to which the sensors are connected. In order to prevent the oil from migrating along the cores and up to the electrical unit, the cores are interrupted outside of the housing, for example, through plug-type connectors or other "oil stoppers." The assembly of the sensors with cores connected thereto is correspondingly difficult.

OBJECTS AND SUMMARY

The invention is based on the object of providing a simpler arrangement of the type described above. In accordance with the invention, the object is met in that the housing has an opening which in the position of use is closed oil-tight and moisture-tight, which has at least one passage hole for passing the cores therethrough, that a core each is used for each of the cores, in which between the conductor and its insulation material which is impermeable to oil is provided which fills out all hollow spaces present within all the space surrounded by the insulation, the cores are guided through at least one sealing plug which tightly surrounds them, and the sealing plug is arranged in the position of use in a passage hole of the passage so as to be oil and moisture tight.

In this arrangement, all cores which are used can be installed between the sensors and the electrical unit without interruption and without the use of any oil-stop elements, so that a compact arrangement is obtained which is simple to assemble. The space surrounded by the insulation of the cores is impermeable for the oil through the additional material, and the sealing plugs prevent oil from penetrating from the outside along the course through the passage. In the case of a solid conductor, the material stopping the oil can be an intermediate layer arranged around the conductor. On the other hand, in a strand conductor, the material also fills out its inner hollow spaces. The sealing plugs surround the cores tightly and sealingly, on the one hand, and on the other hand, they rest within the respective passage hole tightly and sealing against the passage.

BRIEF DESCRIPTION OF THE DRAWINGS

An embodiment of the subject matter of the invention is illustrated in the drawings. In the drawing.

DETAILED DESCRIPTION

Figure 1:
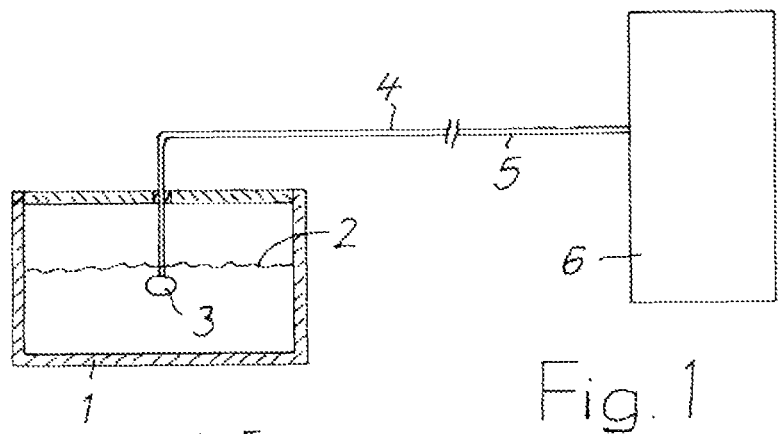
FIG. 1 is a schematic illustration of the arrangement according to the invention.

In FIG. 1, a housing 1 is schematically illustrated, which is, for example, a so-called oil sump in which a transmission of a motor vehicle is mounted. The transmission, not illustrated, has several gear wheels which depending on the speed or adjusted gear of the motor vehicle are in use, i.e., are rotated about their axes with a predetermined rate of rotation. Housing 1 contains oil. This is illustrated by the undulating line 2 in FIG. 1. Accordingly, oil is admitted to the gear wheels of the transmission during the operation of the corresponding motor vehicle.

In accordance with FIG. 1, also arranged in the housing 1 is a sensor 3 which is connected through two electrical cores 4 and 5 to an electrical or electronic unit 6. The cores 4 and 5, which respectively consist of an electrical conductor and an insulation surrounding the conductor, extend without interruption between the sensor 3 and the unit 6. In the space surrounded by the insulation, they have additional material which is impermeable to oil and, thus, seals the space against the penetration of oil. The additional material can be applied as an intermediate layer surrounding the solid conductor. In a strand conductor, it fills out also its inner hollow spaces.

Figure 2:
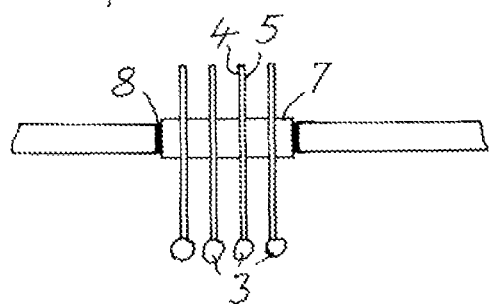
FIG. 2 shows a detail of FIG. 1 on a larger scale.

As a rule, several sensors 3 are mounted in the housing 1, namely, advantageously a sensor for each transmission step. In FIG. 2, four sensors 3 are shown each of which is connected to two cores. The housing 1 has an opening through which the cores can be passed. The opening of the housing 1 is in the position of use closed through a passage 7 in an oil-tight and moisture-tight manner. For this purpose it has a circumferential seal 8, for example, an O-ring which tightly rests against the wall of the housing 1. The passage 7 consists of synthetic material, for example, of polyamid or polybutylene terephthalate.

Figure 3:
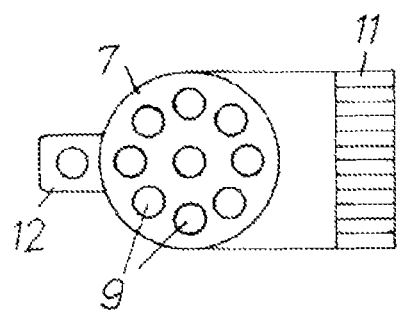
FIG. 3 shows a top view of a passage for use in the arrangement.
Figure 4:
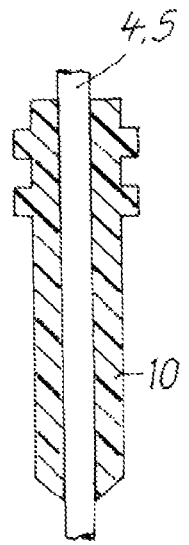
FIG. 4 shows a sealing plug of the arrangement in a further enlarged illustration.

In accordance with FIG. 3, the passage 7 has several throughholes 9 whose number advantageously corresponds to the maximum number of cores which are to be connected, on the one hand, to a sensor 3, and, on the other hand, to the unit 6. At least one throughhole must be provided. In the case of more than one throughhole, the throughholes which are not required for the passage of cores, can be closed or remain. In each throughhole 9, through which at least one core is guided, a sealing plug 10 is arranged in the position of use. Each sealing plug 9 has at least one bore whose inner width is adapted to the outer diameter of a core 4 or 5 in such a way that the latter is surrounded in an oil-tight and moisture-tight manner. However, it is also possible to arrange two or more bores for the passage of two or more cores through only one sealing plug in the latter. For example, the sealing plugs 10 consist of an elastomer, such as, for example, silicone. In the following, sealing plugs 10 are described through which only one core 4 or 5 extends.

Prior to placing the passage 7 in the opening of the housing 1, for example, in each throughhole 9, through which a core 4 or 5 can be guided, a sealing plug 10 is inserted. The cores 4 and 5 can subsequently be pushed or pulled through the sealing plug 10. However, they can also be pulled prior to the insertion of the sealing plug 10 into the throughholes 9, and can be placed accurately with respect to position on the throughholes 9. As a result of the subsequent pressing of the sealing plug 10 into the throughholes 9, an additional pressure is applied in the radial direction on the cores 4 or 5 which, in the sense of the seating against oil, are surrounded even more tightly.

The passage 7 may additionally be equipped with a radial projection 11 on which clamping elements are arranged for securing the cores 4 or 5 with the tensile load being reduced.

Consequently, on the side of the cores 4 and 5 leading to the unit 6, the tensile forces acting on the cores 4 and 5 can have no effect on the area of the sealing plug 10.

At the passage 7, it is also possible to mount a lug 12 for its additional mechanical fastening to the housing 1, for example, by the means of a screw.

The invention claimed is:

1. Arrangement for electrically conductively connecting an electrical component, which is arranged in a housing containing oil, to an electrical unit in which between the component and the unit at least two cores are arranged, which are composed of an electrical conductor and an insulation surrounding the conductor, wherein:

the housing has an opening which in the position of use is closed oil-tight and moisture-tight by a passage, which has at least one passage hole for passing the cores therethrough;

that a core each is used for each of the cores, in which between the conductor and its insulation material which is impermeable to oil is provided which fills out all hollow spaces present within all the space surrounded by the insulation, the cores are guided through at least one sealing plug which tightly surrounds them; and the seating plug is arranged in the position of use in a passage hole of the passage so as to be oil and moisture tight.

2. Arrangement according to claim 1, wherein each core is guided through a separate seating plug.

3. Arrangement according to claim 1, wherein two or more cores extend through a common sealing plug.

4. Arrangement according to one of claim 1, wherein, at the passage is arranged a widened portion with clamping elements for securing the cores with tension relief of the cores.

* * * * *

UNITED STATES PATENT AND TRADEMARK OFFICE
CERTIFICATE OF CORRECTION

Page 1 of 1

PATENT NO. : 8,754,637 B2
APPLICATION NO. : 13/186638
DATED : June 17, 2014
INVENTOR(S) : Nachbauer et al.

It is certified that error appears in the above-identified patent and that said Letters Patent is hereby corrected as shown below:

In the Claims

Column 4, Claim 2, Line 23: The word "seating" between the words "separate" and "plug" should read "sealing"

Signed and Sealed this
Nineteenth Day of August, 2014

Michelle K. Lee
*Deputy Director of the United States Patent and Trademark Office*